United States Patent [19]

Sakata

[11] Patent Number: 4,569,737

[45] Date of Patent: Feb. 11, 1986

[54] METHOD OF INCREASING THE EFFICIENCY OF A LIQUID HYDROCARBON FUEL

[75] Inventor: Hiroshi Sakata, Tokyo, Japan

[73] Assignee: W. Scott Anderson, Pitman, N.J.

[21] Appl. No.: 597,089

[22] Filed: Apr. 5, 1984

[51] Int. Cl.[4] .......................... B01J 19/08; B01J 19/12
[52] U.S. Cl. .................................................. 585/899
[58] Field of Search ............ 204/155, 162 R, 162 HE, 204/158 HE, 158 R; 422/186.01

[56] References Cited

U.S. PATENT DOCUMENTS

| 1,961,358 | 6/1934 | Henry | 204/155 |
| 2,743,223 | 4/1956 | McClinton et al. | 204/158 HE |
| 4,043,308 | 8/1977 | Cerkanowicz | 204/162 R |
| 4,172,019 | 10/1979 | Woodbridge | 204/162 HE |

FOREIGN PATENT DOCUMENTS

| 2032427 | 12/1971 | Fed. Rep. of Germany . | |
| 0123402 | 10/1978 | Japan . | |
| 0071993 | 4/1983 | Japan | 204/155 |
| 0048304 | 4/1983 | Japan | 204/155 |
| 0349175 | 5/1931 | United Kingdom . | |

*Primary Examiner*—Howard S. Williams
*Attorney, Agent, or Firm*—Duffield & Lehrer

[57] ABSTRACT

The efficiency of liquid hydrocarbon fuel is increased by subjecting it to both magnetic forces and radioactive or laser rays. The fuel may be treated by the magnetic forces and rays either simultaneously or alternately. Furthermore, the magnetic forces and radioactive rays can be applied once or can be repeatedly applied. Devices are shown which accomplish these procedures.

2 Claims, 11 Drawing Figures

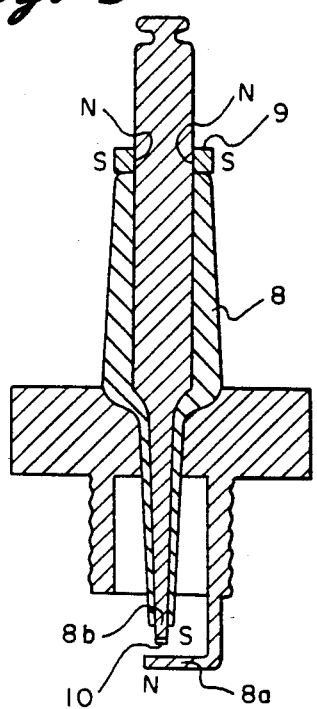
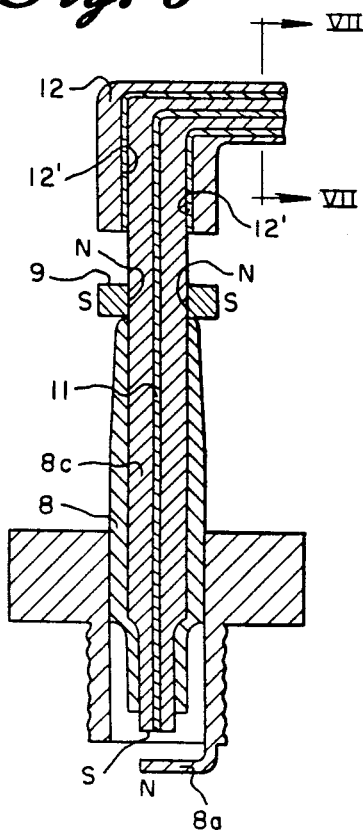
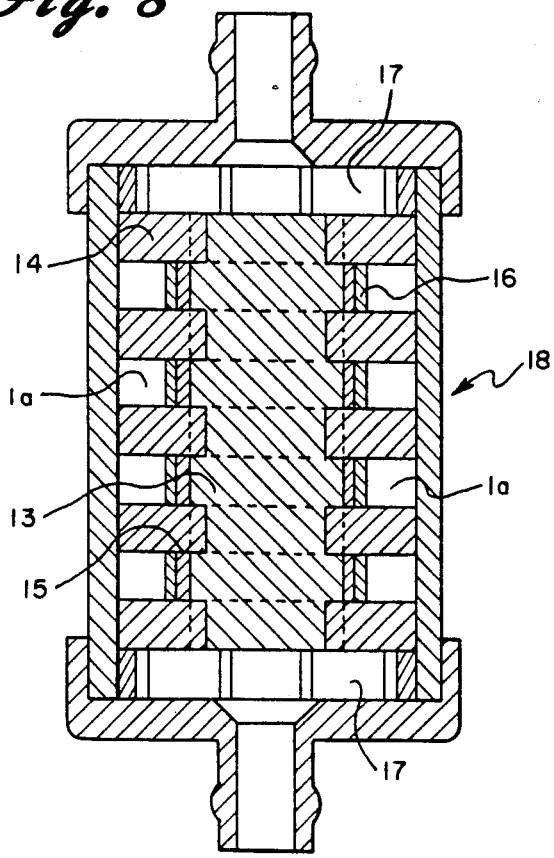
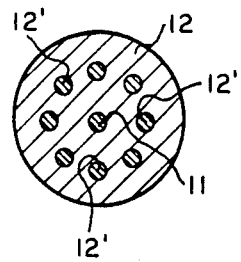

METHOD OF INCREASING THE EFFICIENCY OF A LIQUID HYDROCARBON FUEL

BACKGROUND OF THE INVENTION

The present invention is directed toward a means for modifying liquid hydrocarbon fuels prior to burning in order to increase the efficiency thereof and more particularly toward exposing said fuel to magnetic and one or more other specified types of energy.

Electrons, which are one component making up atoms, have characteristics both as particles and as waves. Mass m is referred to when electrons display particle characteristics and wavelength λ is referred to when electrons display wave characteristics.

Kinetic energy is a common element for both of these characteristics. This kinetic energy is expressed by momentum P and energy E. Therefore, the particle characteristics of electrons are described, when they are moving at a velocity V as shown in the following formulas:

$$P = mV \quad (1)$$

$$E = mC^2 \text{ (where } C = 2.998 \times 10^8 m/s) \quad (2)$$

Mass varies according to velocity V from the formulas mentioned above. The following formula regarding mass m can be introduced when the mass of electrons which are at a standstill is $m_o$ ($9.11 \times 10^{-3}$ kg).

$$m = m_o \frac{1}{\sqrt{1 - \left(\frac{V}{C}\right)^2}}$$

With respect to the wave characteristics of electrons, the relationship between Planck's constant k ($6.626 \times 10^{-34}$ J s) and frequency u is shown in the following formulas:

$$P = k/\lambda \quad (3)$$

$$E = ku \quad (4)$$

From these formulas, it can be said that energy E becomes larger as velocity V becomes larger. Furthermore, the value of energy becomes larger when frequency u, which is displayed by the wave characteristics of electrons, becomes larger. Therefore, the following formulas can be introduced:

$$mC^2 = ku$$

$$m = ku/C^2 \quad (5)$$

When considering wave characteristics of electrons, it can be seen that when the length of the waves become smaller, momentum increases. Therefore, when the above formulas 1 and 3 are equated, the following known equations can be introduced:

$$k/\lambda = mV$$

$$\lambda = k/mV$$

Fuel oil, gasoline and the like are examples of liquid hydrocarbons which demonstrate diamagnetism. This characteristic is related to the spin of the electrons.

When all electron spins are arranged homogeneously, the material is referred to as being ferromagnetic. In the case where the electron spins are heterogeneously arranged and very few electron spins are arranged in a homogeneous manner when a magnetic field is applied, the material is referred to as paramagnetic. In the case of diamagnetism, electrons move circularly by Lorentz forces and the magnetic field generated by the circular movement of electrons negates the external magnetic field which is applied. In this case, the electron becomes a magnet.

This fact indicates that electron moments, which occur when a magnetic field is applied, demonstrate diamagnetism. On the other hand, magnetic moments of spins simply show paramagnetism. Therefore, paramagnetism or diamagnetism of materials are determined by the two types of magnetic moments mentioned above.

When an external magnetic field is applied to the magnetic field of electron spins so that the magnetic field can resonate, the amplitude is increased causing resonant phenomena. These phenomena can be classified as follows: nuclear magnetic resonance, electron spin resonance, paramagnetic resonance, ferromagnetic resonance and diamagnetic resonance. From the fundamental principles discussed above, it is known that:

1. The kinetic energy of molecules can be increased if the mass and velocity of the electron particles or the wavelength or frequency of the electron waves can be changed.
2. Chemical properties can be changed by changing the momentum of the electrons.
3. By diamagnetic resonance, electron movement or spins are greatly affected.
4. Material having diamagnetic properties can be changed into ferromagnetic properties by introducing outside energy sufficient to suppress thermal disturbance.
5. The frequencies of electrons which are determined according to the nuclei, electrons and protons can be changed by the application of external magnetic forces.

Therefore, by repeatedly applying external magnetic forces to liquid hydrocarbon fuels, it is known that the energy generated from the fuel can be changed. Devices have been proposed which are intended to apply magnetic fields to liquid hydrocarbon fuels in order to increase the efficiencies thereof by increasing the amount of energy produced. While some of these devices may be somewhat efficient, they do not go far enough. It is possible to even further increase the amount of energy produced from such fuels.

SUMMARY OF THE INVENTION

The present invention is believed to increase liquid hydrocarbon fuel efficiency and economy above those levels which have been heretofore achieved. This is accomplished, according to the invention, by subjecting the fuel to both a magnetic field and to a second source of energy which preferably is radioactive energy but which may also be laser rays or other forms of electromagnetic waves. The fuel is preferably repeatedly and alternately subjected to the magnetic forces and the radioactive rays by passing the fuel through a substantially cylindrically shaped member alternately and axially spaced magnets and radioactive material in the walls thereof.

BRIEF DESCRIPTION OF THE DRAWINGS

For the purpose of illustrating the invention, there are shown in the accompanying drawings forms which are presently preferred; it being understood that the invention is not intended to be limited to the precise arrangements and instrumentalities shown.

FIG. 5 is a longitudinal cross-sectional view of a spark plug illustrating another form of the invention;

FIG. 6 is a second embodiment of a spark plug illustrating another form of the invention;

FIG. 7 is a cross-sectional view taken through the line VII—VII in FIG. 6;

FIG. 8 is a longitudinal cross-sectional view similar to FIG. 1 but showing a still further embodiment of the invention;

DESCRIPTION OF THE PREFERRED EMBODIMENTS

It has been found that the application of radioactive rays to liquid hydrocarbon fuels increases their combustion efficiency. It is believed that this fact relates to the energy equivalent rule which states that energy has mass and mass has energy. The present invention increases fuel combustion by imparting energy to the fuel material through the use of radioactive rays. Furthermore, with the application of radioactive rays, the atoms and molecules which make up the fuel are energized and are then easily affected by magnetic fields thereby even further greatly increasing the combustion efficiency of the fuel. The combined effect is believed to be the result of the following:

1. High molecular compounds ($C_nH_{2n}$) are subjected to magnetic fields under energized conditions thereby cutting the molecular links causing low molecular compounds. Combustion efficiency is thus increased under these unstable conditions.
2. Electrons of the atoms which comprise the fuel are activated by radioactive rays and are moved and transformed thereby causing mass changes.
3. The spin cycles of activated electrons by radioactive rays are controlled with the outside magnetic field whereby the fuel is chemically activated.

Figure 1:
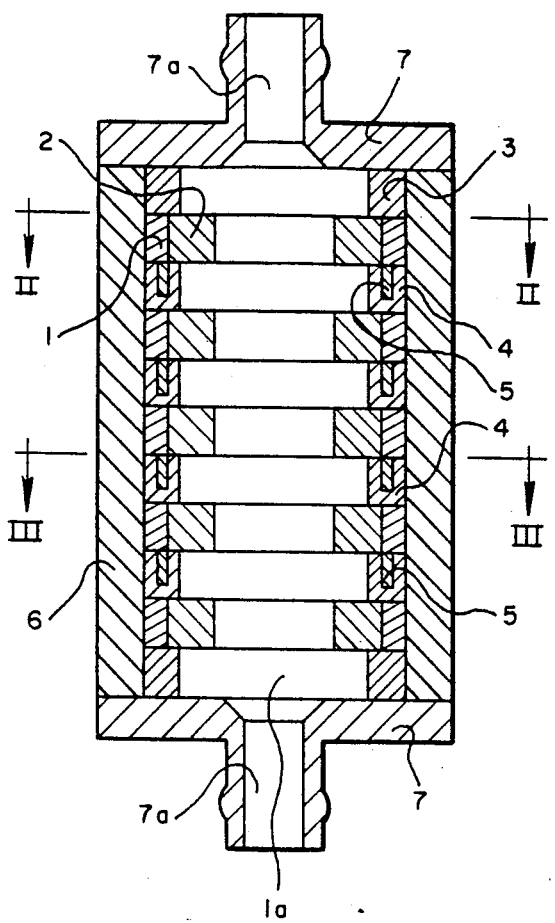
FIG. 1 is a longitudinal cross-sectional view of a fuel economizer device constructed in accordance with the principles of the present invention.
Figure 2:
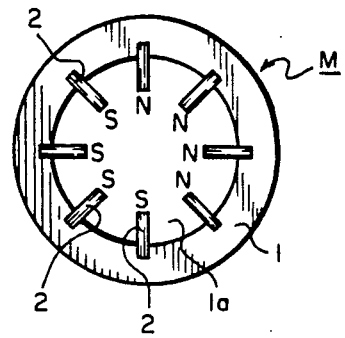
FIG. 2 is a cross-sectional view taken through the line II—II in FIG. 1.
Figure 3:
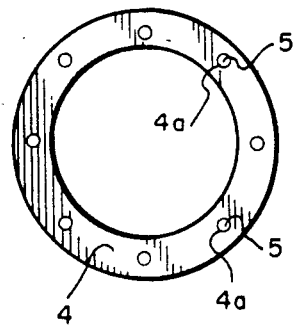
FIG. 3 is a cross-sectional view taken through the line III—III in FIG. 1.

One embodiment of a device for carrying out the present invention is shown in FIGS. 1, 2 and 3. The device includes a plurality of axially aligned donut-shaped rings 1 having a hole 1a passing therethrough. A number of magnets 2 are secured to the interior of the rings 1 so that the magnetic poles N and S face each other to form magnetic field generators M as shown most clearly in FIG. 2. The magnetic field generators are axially arranged and alternate with radioactive ray generators 4 which are constructed primarily of non-magnetic material. Spacer rings 3 are inserted at the top and bottom of the stack of alternating magnetic field generators M and radioactive ray generators 4.

As shown most clearly in FIGS. 1 and 3, the radioactive ray generators are also comprised of donut-shaped rings and have a plurality of holes 4a formed therein and substantially equally spaced around the ring. The holes are formed in the axial direction and are filled with radioactive material 5.

The stack of magnetic field generators M alternating with the radioactive generators 4 and the spacer rings 3 are positioned within a cylindrical case 6. Both end walls of the case 6 are covered with cover members 7 having holes 7a therein which communicate with the inside hole 1a and through which liquid hydrocarbon fuel can pass.

A device constructed in accordance with the foregoing description was utilized in the fuel line of a motorcycle engine. This experiment was run in accordance with the following particulars and the results are set forth in Table I which follows therebelow.

EXPERIMENT 1

| | |
|---|---|
| 1. Magnet Rings | 5 Pieces, Outer Diameter of 22 mm, Inside Diameter of 16 mm |
| 2. Magnet | 8 Magnets for Each Magnet Ring Samarium-Magnet Dimensions in mm: 4 × 4 × 0.8 Magnetic Force of Each Magnet: 4,000 Gausses |
| 3. Radioactive Ray Generator | Outside Diameter of 22 mm, Inside Diameter of 16 mm, One Piece With 8 Holes Having a Depth of 3mm and Diameter of 1 mm |
| 4. Radioactive Material | Fluorescent Paint in the Market Containing Thorium |
| 5. Motorcycle | New HONDA Duct Motorcycle With 50 cc Engine |
| 6. Procedure | The distance which the motorcycle can run with 1 liter of fuel when equipped with this device was measured The device is then dismantled and the distance was measured under the same conditions. This test was performed with the same driver and over the same course. |

TABLE I

| Test Number | Motorcycle Not Equipped With This Device A | Motorcycle Equipped With This Device B | Increased By % | B - A |
|---|---|---|---|---|
| 1 | 54 km | 69 km | 27.7 | 15 |
| 2 | 56 km | 70.2 km | 25.3 | 14.2 |
| 3 | 50 km | 66 km | 32.0 | 16 |
| 4 | 52 km | 68.6 km | 31.9 | 16.6 |
| Total | 212 km | 273.8 km | 116.9 | 61.8 |
| Average | | | 29.2 | |

EXPERIMENT 2

A second experiment utilizing the above-described device was conducted utilizing a steam boiler which had been operating at a factory and which burned type A fuel oil. The experiment utilized a smoke detector for comparing, in percentages, the oxygen concentrations in the exhaust gas when ordinary type A heavy fuel oil was burned and when the fuel oil is first modified or treated utilizing the invention.

The results indicated that the oxygen concentration was remarkably lower in the modified fuel oil than in the case where conventional fuel oil was burned. The heat loss decrease in the case were oxygen concentration in an exhaust gas is decreased from 2.5% to 1.5% is calculated as follows:

1. Theoretical Air Volume $A_o$ Required for Combustion:

$$A_o = \frac{0.85 \text{ Hl}}{1,000} + 1.5 = 9.73 \text{ Nm}^3/\text{kg Oil}$$

2. Air Ratio $m_1$ When Oxygen Concentration is 2.5%:

$$m_1 = \frac{21}{21 - O_2} = \frac{21}{21 - 2.5} = 1.135$$

3. Air Ratio $m_2$ When Oxygen Concentration is 1.5%:

$$m_2 = \frac{21}{21 - 1.5} = 1.07$$

The heat loss is exhaust gas is as follows:

$(m_1 - m_2)A_o \times C \times t = (0.065) \times 9.73 \times 0.33 \times 140 = 29.2 \text{ kcal/kg Oil}$ As an example, annual savings when 1,500 kg heavy oil is burned for 8,000 hours are as follows:

$$\frac{1,500 \text{ kg} \times 8,000 \text{ H} \times 29.2 \text{ kcal/kg}}{9,690 \text{ kcal/kg} \times 0.95} = \text{Oil Price Per Liter}$$

$= 38,069.2 \times \text{Oil Price Per Liter}$ where,
C: Specific Heat of Gas in Dry Combustion
t: Exhaust Gas Temperature Assuming the oil price per liter is $0.086, the savings obtained from the formula mentioned above are approximately $3268.00

Figure 4:
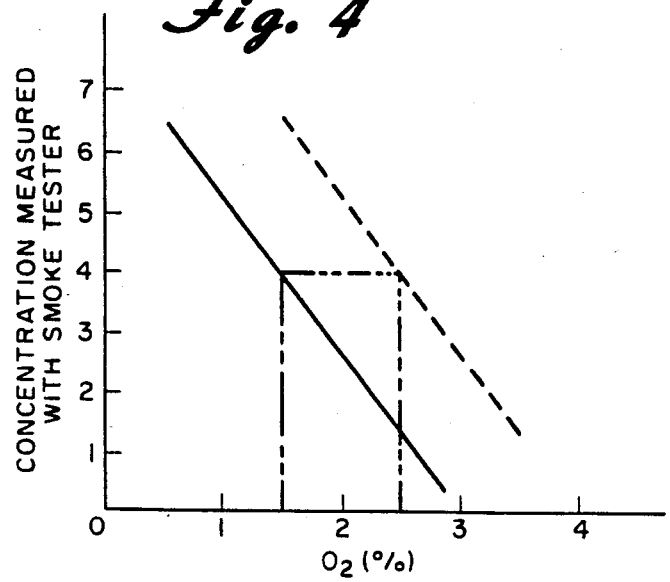
FIG. 4 is a diagram explaining the results of an experiment conducted in accordance with the invention.

The results of this experiment are illustrated in FIG. 4 wherein the solid line represents the use of a fuel economizer constructed in accordance with the invention and the broken line shows the burning of the fuel oil without the use of the inventive device. It can be seen from FIG. 4 that the concentration of oxygen is substantially less when the present invention is utilized.

The invention described above modifies the liquid hydrocarbon fuel as the same is passed through a cylindrical member and wherein the fuel is then subjected to a magnetic field and radioactive rays. It is also possible, however, to modify the fuel directly at the point of combustion. FIG. 5 illustrates such an arrangement.

As shown in FIG. 5, the invention is embodied in a spark plug having a body portion 8. A ring magnet 9 surrounds the body portion 8 so that a magnetic field is set up between the poles 8a and 8b at the tip of the plug. Radioactive substance 10 is applied to at least one of the poles 8a or 8b. Thus, just prior to and during the time that fuel is combusted in the cylinder, it is subjected to magnetic forces and radioactive rays.

While the present invention is primarily concerned with the application of magnetic forces and radioactive rays to liquid hydrocarbon fuels, experiments have also shown that similar results can be obtained by utilizing laser and other electromagnetic waves instead of radioactive rays. A spark plug embodying this aspect of the invention is shown in FIGS. 6 and 7.

The spark plug shown in FIGS. 6 and 7 includes an optical fiber 11 which passes through the central hole formed in the conductor 8c of the plug body 8. The optical fiber 11 is used to conduct light from a remotely located laser to the tip of the spark plug. An insulated cable 12 containing a plurality of wires 12' which are connected to the conductor 8c are positioned around the optical fiber 11. The optical fiber 11 also passes through the center of the cable 12 as shown in FIG. 7.

The remaining portions of the spark plug shown in FIGS. 6 and 7 are similar to the device shown in FIG. 5. That is, a magnet 9 is arranged around the body portion of the plug whereby a magnetic field is created between the poles at the tip of the plug. It has been found that with the use of a plug constructed as shown in FIG. 6, combustion efficiency is increased when the atomized fuel in the cylinder is burned while applying a magnetic field and laser energy thereto.

The device described above with reference to FIGS. 1–3 is constructed such that the magnetic field and the radioactive rays are alternately applied to the fuel. It is, of course, also possible to simultaneously apply these two energies. This could be done, for example, by providing holes such as the holes 4a in the magnetic ring 1 and by placing the radioactive material therein. Furthermore, in the examples shown in FIG. 1, radioactive rays and magnetic fields are applied to the fuel a plurality of times. However, it has been found that good results can also be obtained when the energy is applied to the fuel at only one time. Because of space limitations, embodying the invention in small devices may make it necessary to apply the energies to the fuel on only one occasion.

FIGS. 8–11 illustrate another embodiment of the invention which is similar to the device shown in FIG. 1 but which has a different arrangement for the passage of fuel. In the device shown in these figures, the magnets 14 have one end secured to a cylindrical center support member 13 and extend radially outwardly therefrom as shown most clearly in FIG. 9. A plurality of radioactive ray generating rings 15 including radioactive material 16 thereon surround the support 13 and are arranged between axially spaced layers of magnets 14 so that there are alternating layers of magnets and radioactive ray generating rings. It can be seen, therefore, that the fuel passage is formed on the outside of the magnet support member 13 rather than at the inside thereof as in FIG. 1.

Figure 9:
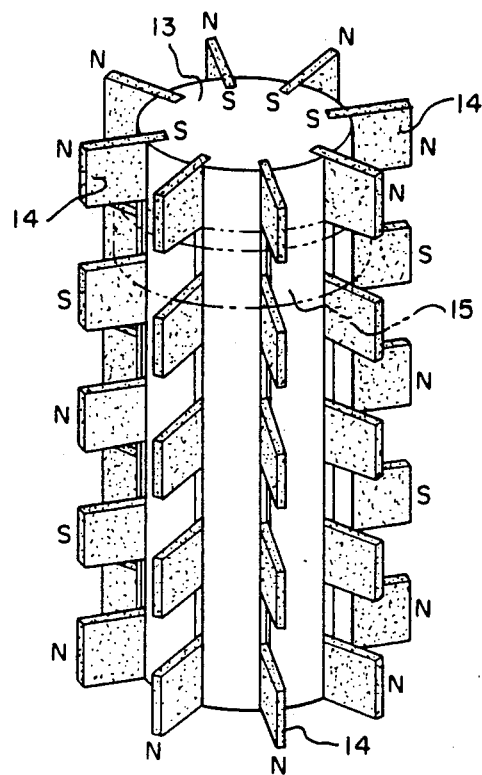
FIG. 9 is a perspective view of a magnet holder utilized in connection with the embodiment shown in FIG. 8.
Figure 10:
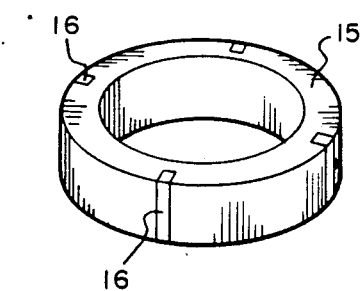
FIG. 10 is a perspective view of a radioactive generating ring utilized with the embodiment shown in FIG. 8.

The magnetic field in the device shown in FIGS. 8–11 can be generated by opposing poles of magnets in the same axial layer. However, experiments have shown that better results are obtained when like poles are arranged at the same layer or stage. For example, and as shown in FIG. 9, the N pole repulsion field is formed at the first stage and the S pole repulsion field at the second stage.

Figure 11:
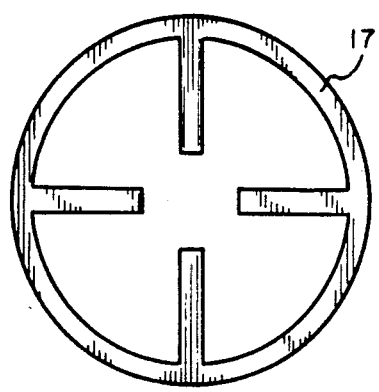
FIG. 11 is a plan view of a spacer ring utilized with the embodiment of the invention shown in FIG. 8.

A spacer ring 17, shown most clearly in FIGS. 8 and 11, is attached to the top and bottom of the magnet support cylinder 13 and the entire structure is then inserted into a cylindrical housing 18. The fuel passage thus formed lies between the outside surface of the magnet support cylinder 13 and the inside surface of the case 18.

The present invention may be embodied in other specific forms without departing from the spirit or essential attributes thereof and accordingly, reference should be made to the appended claims rather than to the foregoing specification as indicating the scope of the invention.

I claim:

1. A method of increasing the efficiency of a liquid hydrocarbon fuel comprising the steps of repeatedly and alternately subjecting said fuel to a magnetic field and to radioactive rays.

2. The method of claim 1 wherein said fuel is subjected to said magnetic field and said rays in a fuel line as said fuel is flowing toward a combustion chamber.

* * * * *